United States Patent [19]
Fultz

[11] Patent Number: 5,445,483
[45] Date of Patent: Aug. 29, 1995

[54] FEMALE CLINCH FASTENER WITH COLD-FORMED LOCKING FLANGE AND ASSOCIATED INSTALLATION METHOD

[75] Inventor: Robb M. Fultz, Huntington, Ind.

[73] Assignee: Emhart Inc., Newark, Del.

[21] Appl. No.: 110,451

[22] Filed: Aug. 23, 1993

[51] Int. Cl.⁶ .................... F16B 37/04; B23P 11/00
[52] U.S. Cl. .................... 411/181; 411/179; 411/183; 29/432.2; 29/525.2
[58] Field of Search ............ 411/107, 179, 180, 181, 411/183, 177; 403/282–285; 29/432.2, 524.1, 525.2

[56] References Cited

U.S. PATENT DOCUMENTS

| | | | |
|---|---|---|---|
| 2,026,757 | 1/1936 | Swanstrom | 411/181 X |
| 3,381,362 | 5/1968 | Church et al. | 411/181 X |
| 4,018,257 | 4/1977 | Jack | 411/180 X |
| 4,724,610 | 2/1988 | Muller | 411/179 X |
| 4,810,143 | 3/1989 | Muller | 411/181 |
| 4,825,527 | 5/1989 | Ladouceur | 411/180 X |
| 5,006,025 | 4/1991 | Duran | 411/177 X |

FOREIGN PATENT DOCUMENTS

938490  10/1963  United Kingdom ............... 411/179

Primary Examiner—Neill R. Wilson
Attorney, Agent, or Firm—E. D. Murphy

[57] ABSTRACT

A female clinch fastener adapted to be secured to a sheet by cold-forming includes a generally tubular body having a plurality of circumferentially distributed splines. Longitudinally extending portions of the splines are adapted to be displaced by cold-forming or a peeling action to form a laterally extending flange along a medial portion of the tubular body. The clinch fastener also preferably includes a laterally extending flange at one end cooperating with the cold-formed flange to secure the fastener within a pilot, or collar, formed at an opening in the sheet to which the clinch nut is secured. The splines adjacent the end flange are also secured within the pilot of the sheet and prevent rotation of the clinch fastener. The tubular body also preferably has a second end portion being tapered to serve as a guide surface to facilitate alignment with an opening in the sheet during installation, and also serves as a guide surface for beginning the cold-forming, or peeling, of the splines to form the flange in the medial portion of the tubular body.

58 Claims, 3 Drawing Sheets

FEMALE CLINCH FASTENER WITH COLD-FORMED LOCKING FLANGE AND ASSOCIATED INSTALLATION METHOD

FIELD OF THE INVENTION

The invention relates to the field of fasteners, and, more particularly, to a female clinch fastener, or clinch nut, mounted to a sheet and an associated method for installing the clinch fastener.

BACKGROUND OF THE INVENTION

A conventional female clinch fastener, or clinch nut, is permanently installed into a portion of a metal sheet so that the nut becomes an integral part of the metal sheet. The clinch nut is installed by cold-forming the metal of the sheet or the nut, rather than welding. The clinch nut thus provides a threaded bore with greater holding capacity than could be obtained by simply threading an opening in the sheet metal alone. Such a clinch nut is commonly used in automobiles to provide a means for fastening bolts to a metal sheet, for example.

One conventional clinch nut is available from RB&W Corporation of Mentor, Ohio, under the designation SPAC®nut. The SPAC®nut includes a back-tapered polygonal portion that is press fit into a slightly undersized opening in a sheet. The nut is locked into the sheet by a coining action as the sheet material flows to fill the space defined by the back-tapered portion. Similar to the SPAC®nut are the STRUX-nut offered by Maclean-Fogg, and the HT-nut offered by NPR. Each of these clinch nuts relies upon the volumetric displacement of parent material from the sheet to fill an undercut or back-taper to create a kind of dove-tail joint between the fastener and the sheet. Unfortunately, such a clinch nut may not have sufficiently high performance characteristics, such as pull-through, push-out, and torque-out.

Another conventional clinch nut offered by the assignee of the present invention, requires that a hexagonal opening be punched into the sheet to accommodate the hexagonal body portion of the clinch nut. In other words, the clinch nut is a directional nut which requires proper orientation of the opening and proper alignment of the nut within the opening.

Another conventional clinch nut known commercially as the FLANGEFORM TM from RB&W, is disclosed in U.S. Pat. No. 4,018,257 to Jack entitled *Self-Flanging Nut and Joint Construction*. The FLANGEFORM TM nut forms, and then wraps around, a collar or pilot in the sheet into which the nut has been pressed. The nut is press fit into an undersized opening in the sheet thereby bending edge portions of the sheet downward to form the pilot for receiving the tubular body of the nut. A laterally extending flange on an end of the tubular body is seated flush with the surface of the sheet. The tubular body includes a threaded bore over a first portion adjacent the head. A second portion of the tubular body includes an enlarged bore which facilitates folding of side walls of the tubular body over and radially outwardly to form a second or locking flange to secure the nut within the pilot of the sheet. A relatively small number of circumferentially distributed ribs extend longitudinally along the first portion of the tubular body to prevent rotational movement or torque-out of the nut.

The FLANGEFORM TM nut is a nondirectional nut, that is, it can be installed in a circular opening without concern for relative rotational orientation of the nut and the opening. In addition, this nut offers improved performance characteristics over those conventional nuts described above which rely on the volumetric displacement of parent material from the sheet.

Unfortunately, the FLANGEFORM TM nut suffers from a number of disadvantages including a relatively high cost of manufacture due, at least in part, to its varying cross-sectional shape. Moreover, for a given nut size, only a limited range of sheet material thicknesses and sizes of openings can be accommodated. In other words, since a predetermined portion of the tubular body is folded over for a given nut size, the length of the pilot that can be effectively clamped between the head and the folded over locking flange must be accurately controlled.

A further drawback of the FLANGEFORM TM nut is that it cannot readily be made to have a so-called "prevailing torque" feature. A prevailing torque fastener includes slightly distorted threads that serve to lock the mating fastener in position and prevent unintended loosening of the fastener. Because the FLANGEFORM TM nut includes a threaded bore extending only partially through its lengthwise extent, the prevailing torque feature is not available.

The FLANGEFORM TM nut is also secured by the second metal flange which is formed by bending or folding over a portion of the tubular body to abut end portions of the pilot formed in the sheet. This type of bending to cold-form the locking flange produces a relatively weak metal flange that may produce a nut having reduced pull-out performance.

Similar to the FLANGEFORM® nut, is the PIERCEFORM® stud offered by Kean Manufacturing of Dearborn Heights, Mich. The PIERCEFORM® Stud is a male clinch fastener, or clinch bolt, having a threaded stud extending outwardly from a head, the head, in turn, being secured within a pilot formed in the sheet as described above similar to the FLANGEFORM TM nut. A portion of the head is a hollow tube having walls that are folded over to form the locking flange. Accordingly, the PIERCEFORM® Stud suffers from similar disadvantages as the FLANGEFORM TM clinch nut.

SUMMARY OF THE INVENTION

In view of the foregoing background, it is therefore an object of the present invention to provide a high performance female clinch fastener, or clinch nut, which is suitable for installation into a sheet having a range of thicknesses and opening sizes.

It is another object of the present invention to provide a high performance clinch nut which is readily manufactured, relatively inexpensive, and easily installed into a sheet without regard to its rotational orientation with respect to the opening.

These and other objects, features, and advantages of the present invention are provided by a female clinch fastener including a generally tubular body having a plurality of circumferentially distributed splines, and wherein longitudinally extending portions of the splines are adapted to be displaced by cold-forming, or peeling, to form a laterally extending locking flange along a medial portion of the tubular body. The clinch fastener also preferably includes a laterally extending flange at one end cooperating with the cold-formed locking flange to secure the fastener within a pilot, or collar, formed at an opening in a sheet. Accordingly, portions of the splines adjacent the end flange are also secured within the pilot to prevent rotation of the clinch fastener within the pilot.

The tubular body also preferably has a second end portion being tapered and having a smaller diameter transverse cross-section being axially outermost, and a larger diameter transverse cross-section defined by peripheral portions of the splines. The tapered second end serves as a guide surface to facilitate alignment with the opening in the sheet during installation of the fastener, serves to roll or form the pilot in the sheet, and also serves as a guide surface for beginning the cold-forming or peeling of the splines to form the locking flange in the medial portion of the tubular body.

Because the cold-formed locking flange of the clinch fastener is formed by peeling a portion of the splines, the flange may be positioned within a range of longitudinal positions along the tubular body. This capability allows the clinch fastener to accommodate a wide range of opening dimensions and sheet thicknesses, in contrast to the fairly limited ranges available using conventional fasteners, such as the FLANGEFORM TM fastener.

Another feature of the present invention is that it can readily be adapted to be a prevailing torque fastener to prevent the unintended loosening of a male fastener secured within the threaded bore of the tubular body. The bore of the tubular body is preferably threaded throughout the entire extent of the tubular body. Thus, and as would be readily understood by those skilled in the art, threads adjacent the second end of the tubular body may be distorted to provide a locking action to the mating threaded fastener received within the threaded bore of the tubular body.

The tubular body, the first flange and the splines are preferably integrally formed of metal, while the second flange is cold-formed metal displaced from a portion of the splines on the tubular body. Cold-forming of the metal by the peeling action produces a harder and stronger metal flange. The metal of the clinch nut is preferably selected from the group consisting of low carbon steel, medium carbon steel, and heat treated medium carbon steel. The sheet may preferably be metal, however, the sheet may also be plastic, such as polyethylene, as would be readily understood by those skilled in the art. The circumferentially distributed splines permit the opening in the sheet to be circular, thus, eliminating a requirement for rotationally orienting the clinch fastener with respect to the sheet as part of the installation process.

The plurality of splines preferably define a polygonal transverse cross-sectional shape. In one embodiment of the female clinch fastener, the splines define a star-like transverse cross-sectional shape. In another embodiment, the splines preferably define a serpentine or sinuous generally circular transverse cross-sectional shape. Both such transverse cross-sectional shapes may be readily formed by conventional cold-forming techniques as would be appreciated by those skilled in the art. In addition, the plurality of splines is preferably a predetermined number in a range of about 8 to 16, and more preferably about 12, for typical commercially desired fastener sizes.

The clinch fastener, when installed into an opening of a sheet, produces a pilot or collar by deforming the sheet material adjacent the opening. The pilot depends from the sheet and cooperates with the first and second laterally extending flanges of the clinch nut to provide excellent pull-through and push-out characteristics for the clinch fastener. The second or cold-formed flange abuts an end portion of the pilot. The first or end flange of the clinch fastener also preferably has an inwardly tapered annular surface transverse to the tubular body for facilitating flush mounting of the flange with the sheet.

After the clinch fastener is installed and the second flange formed, the tubular body has a second portion extending longitudinally outward from the second flange and from which a portion of the splines have been displaced, or peeled, to form the flange. In other words, this second portion of the tubular body has a transverse cross-sectional diameter less than a predetermined diameter defined by peripheral portions of the splines. Accordingly, this second portion of the tubular body also has circumferentially distributed longitudinally extending grooves in alignment with respective grooves defined by the plurality of splines remaining on a first portion of the tubular body and secured within the pilot formed in the sheet. In addition, the cold-formed flange may preferably take the form of a plurality of radially outwardly extending bulbous protrusions longitudinally aligned with respective splines.

A method aspect of the present invention is for securing the female clinch fastener to a sheet. The clinch fastener is as described above and includes a tubular body with a first laterally extending flange at an end thereof and plurality of longitudinally extending splines circumferentially distributed on the tubular body. The installation method preferably includes the steps of forming an opening in the sheet having a diameter less than a diameter defined by peripheral portions of the splines; driving the tubular body of the clinch fastener into the opening to form a pilot surrounding the splines from along a first portion of the tubular body; and longitudinally displacing portions of the splines from along a second portion of the tubular body to form a second laterally extending flange abutting the pilot and cooperating with the first flange to secure the clinch fastener within the sheet.

The step of driving the tubular body of the clinch fastener preferably includes driving same so that the first flange is flush with a surface of the sheet. The clinch fastener also preferably includes a tapered second end so that a further step of aligning the clinch fastener with the opening in the sheet may be performed by positioning the tapered second end partially extending into the opening. In addition, as would be readily understood by those skilled in the art, dies or other tooling may be provided so that the steps of driving the tubular body and forming the second, or locking flange may be performed simultaneously.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, applicant provides these embodiments so that this disclosure will be thorough and complete, and will fully convey the scope of the invention to those skilled in the art. Prime and double prime notations are used to indicate like elements in alternate embodiments.

Figures 1, 2, 3, 4, 5, 6:
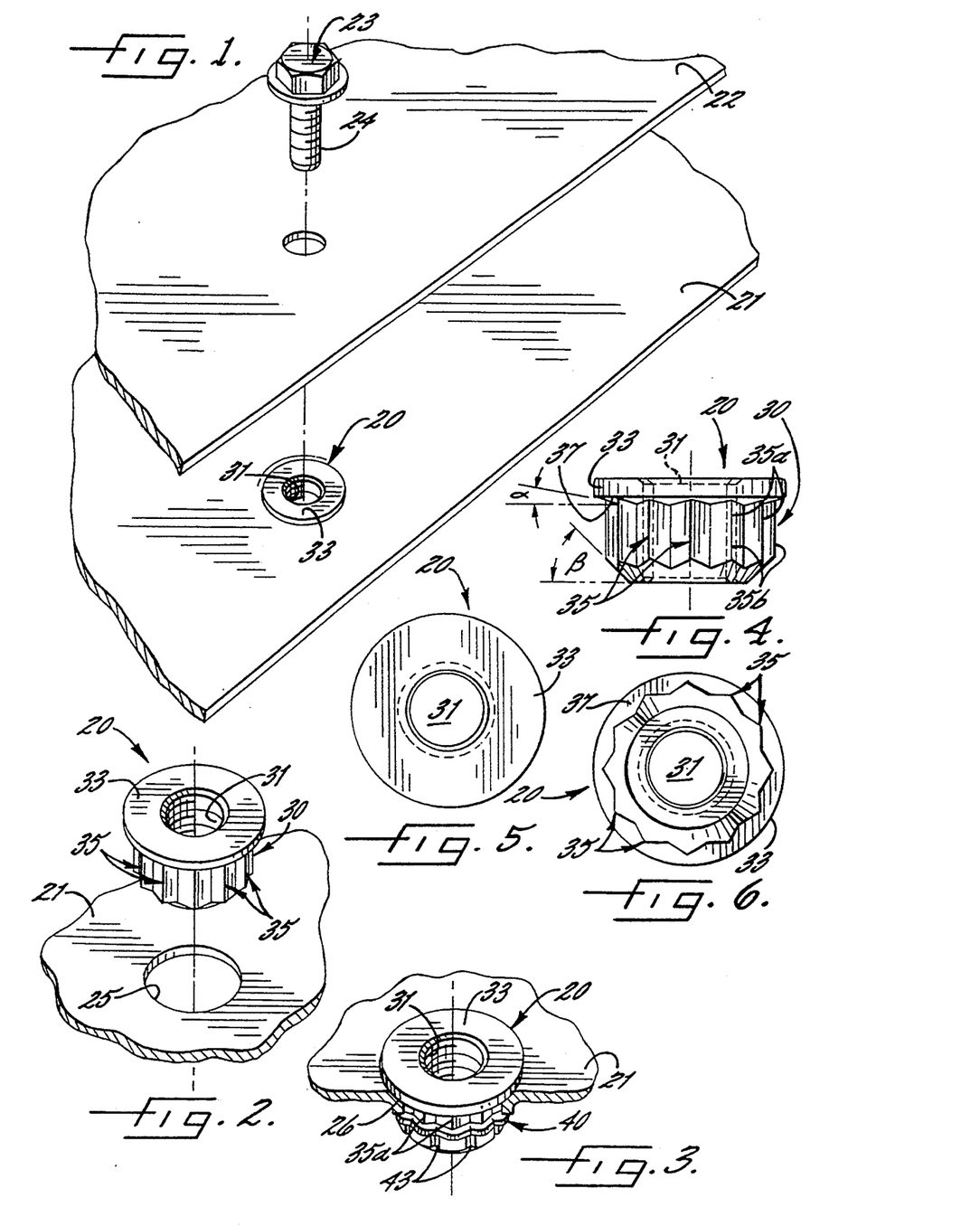
FIG. 1 is an exploded perspective view of a female clinch fastener according to the invention installed in a metal sheet for use in securing a second sheet thereto.
FIG. 2 is a greatly enlarged exploded perspective view of the female clinch faster according to the invention prior to its installation within the opening in the sheet.
FIG. 3 is a greatly enlarged fragmentary perspective view, partially in section, illustrating the female clinch fastener according to the invention installed in the sheet.
FIG. 4 is a greatly enlarged side elevational view of the female clinch fastener according to the invention.
FIG. 5 is a greatly enlarged plan view of the female clinch fastener according to the invention.
FIG. 6 is a greatly enlarged bottom view of the female clinch fastener according to the invention.

Referring first to FIG. 1, the female clinch fastener, or clinch nut, 20 according to the invention is shown installed in a first sheet 21. The clinch nut 20 is typically used to receive the threaded shaft 24 of a mating male fastener, or bolt, 23, such as for securing a second sheet 22 to the first sheet 21 as shown. Those skilled in the art will readily appreciate many applications for the clinch nut 20 according to the invention, particularly in the area of industrial products and, more particularly, for use in automobiles. The clinch nut 20 provides a female fastener of much greater holding power than could be obtained by simply threading an opening in the sheet 21.

Referring now additionally to FIGS. 2-6, the clinch nut 20 according to the invention is further described. The clinch nut 20 includes a generally tubular body 30 having a threaded bore 31 adapted to receive therein the threaded shaft 24 of a mating threaded fastener 23. The clinch nut 20 also includes a first laterally extending flange 33 connected to the tubular body 30 at a first or upper end.

A plurality of circumferentially distributed splines 35 are connected to the tubular body 30 and extend longitudinally therealong. First longitudinally extending portions of the splines 35a (FIG. 4) are adapted to be secured within a collar or pilot 26 formed in the sheet 21 to prevent rotation of the clinch nut 20, thereby providing excellent torque-out performance. Second longitudinally extending portions of the splines 35b (FIG. 4) are adapted to be displaced longitudinally to form a second laterally extending locking flange 40 in a medial portion of the tubular body 30 for securing the female clinch fastener 20 within the pilot 26 of the sheet 21. In other words, the first flange 33 and the second flange 40 cooperate to secure the clinch nut 20 within the pilot 26 formed in the sheet 21, while providing high pull-through and push-out performance. Moreover, the female clinch fastener 20 can accommodate a range of sheet thicknesses and opening dimensions by varying the longitudinal position of the second or locking flange 40 along tubular body 30 of the fastener.

As shown perhaps best in FIG. 4, the tubular body 30 has a second end portion being tapered and having a smaller diameter transverse cross-section being axially outermost and a larger diameter transverse cross-section defined by peripheral portions of the splines 35. The taper angle $\beta$ is preferably in the range of about 40°-50°, and more preferably about 45°. The tapered end of the tubular body 30 serves several purposes including: guiding or centering the clinch nut 20 in the opening 25 of the sheet 21 during installation, rolling or forming the sheet to form the pilot 26 and for facilitating peeling down or shaving a portion of the splines 35 longitudinally to produce the cold-formed flange 40, as also described in greater detail below.

The first flange 33 at the first end of the tubular body 30 has a tapered annular surface 37 transverse to the tubular body for facilitating flush mounting of the flange with the upper surface of the sheet 21 (FIGS. 1 and 2). The taper angle $\alpha$ is preferably in the range of about 5°-10° (FIG. 2).

As would be readily understood by those skilled in the art, the clinch nut 20 according to the present invention is preferably an integrally formed metal part that may be formed by conventional metal stamping and/or metal machining techniques. In other words, the tubular body 30, the first flange 33 and the splines 35 are preferably integrally formed of metal. In addition, after the clinch fastener 20 is installed, the second flange 40 is cold-formed metal displaced from the second portion of the tubular body 30. The metal of the clinch nut 20 is preferably selected from the group consisting of low carbon steel (Class 5), medium carbon steel (Class 9), and heat treated medium carbon steel (Class 10). The sheet 21 may preferably be metal, however, the sheet may also be plastic, such as polyethylene, as would be readily understood by those skilled in the art.

The splines 35 extending along the tubular body 30 are regularly spaced and generally define a polygonal transverse cross-sectional shape. In addition, the cross-sectional shape of the splines may be generally uniform but for the tapered end, to thereby provide a more readily and inexpensively manufactured fastener. More preferably, the splines 35 may define a star-like transverse cross-sectional shape. This star-like pattern has relatively sharp outer edges, or points, and may be readily formed by conventional stamping techniques. For typical clinch nut 20 sizes commonly used, the number of splines 35 is preferably in the range of about 8 to 16, and more preferably about 12. A small number of splines may tend to crack or damage the pilot 26 formed in the sheet, while a relatively large number of splines may provide reduced torque-out performance.

Figure 16:
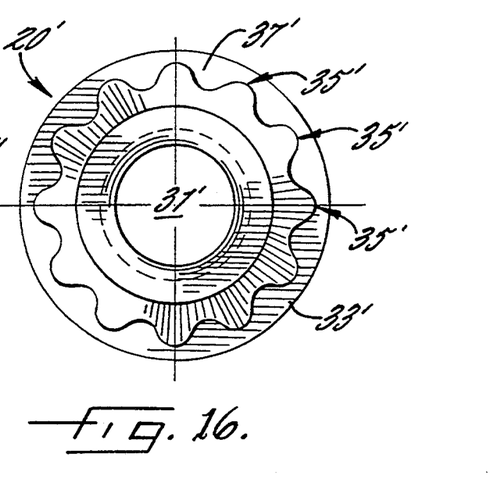
FIG. 16 is a greatly enlarged bottom view, similar to FIG. 6, but illustrating an alternate embodiment of splines of the female clinch fastener according to the invention.

Referring now briefly to FIG. 16, an alternate embodiment of a clinch nut 20' having a slightly different spline 35' configuration is illustrated. In this embodiment the splines 35' define a serpentine, or sinuous, generally circular transverse cross-sectional shape. In other words, the relatively sharp edges of the first illustrated embodiment are rounded to provide the serpentine or sinuous shape. The other portions of the second embodiment of the clinch nut 20' are indicated by prime notation and are similar to the first embodiment as described above. Accordingly, this embodiment needs no further discussion. Those of skill in the art will readily appreciate other configurations of splines equivalent to those of the illustrated embodiments.

Figure 7:
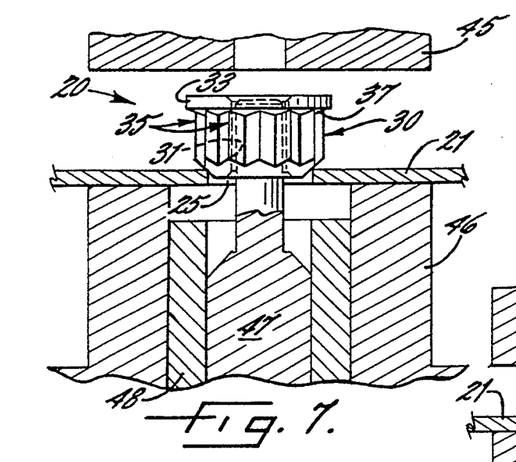
FIGS. 7-9 are schematic views, partially in section, illustrating a method of installing the female clinch fastener according to the invention.

Now referring additionally to FIGS. 7-5, the method of installing the clinch nut 20 according to the invention, as well as other features and advantages of the present invention are explained. As shown in FIG. 7, the clinch nut 20 is centered over an opening 25 formed in the sheet 21. More particularly, an upstanding post of a lower center die member 47 is positioned through the bore 31 of the clinch nut 20. Moreover, the tapered second end of the tubular body 30 facilitates aligning or centering of the clinch nut 20 over the opening 25 in the sheet 21 and facilitates formation of the pilot 26.

The opening 25 in the sheet 21 is preferably of a smaller diameter than the diameter of an imaginary circle defined by peripheral portions of the splines 35. In addition, the number of splines, typically 8-16, and their shape, allow the clinch nut 20 to be installed without regard to its rotational orientation with respect to the opening. As shown in the illustrated embodiment, the apparatus includes an upper movable press 45, a generally cylindrical lower die body 46, and a sleeve 48 positioned between the die body and the center die member 47. The relative vertical position of the sleeve 48 is preferably adjustable, such as to accommodate different sheet 21 thicknesses.

Figure 8:
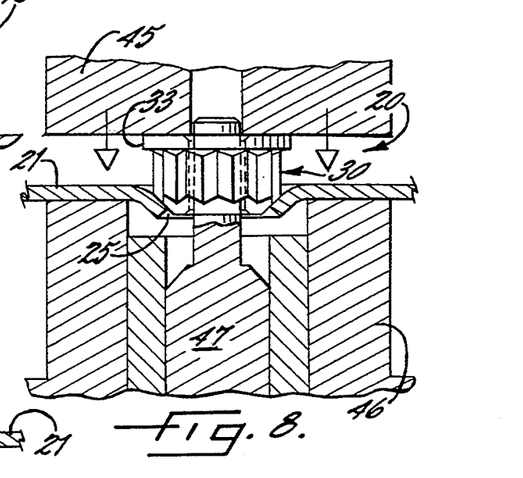
Figure 9:
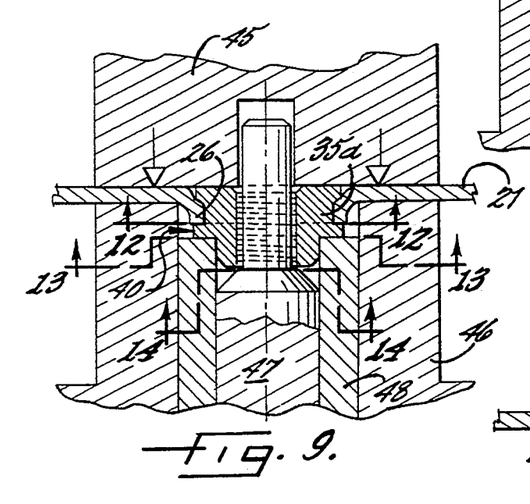

As shown in FIG. 8, as the upper press 45 is lowered, it engages the clinch nut 20 and forces the nut into the opening 25 of the sheet, thus deforming or bending down edge portions of the sheet adjacent the opening. In FIG. 9, the upper press 45 has completed its stroke and the clinch nut 20 is positioned within the pilot 26 simultaneously formed in the sheet 21.

During the downward stroke of the press 45, the tapered end of the clinch nut 20 contacts the shoulder defined by the sleeve 48. Thus, longitudinally extending portions of the splines 35b from along a second portion of the tubular body 30 are displaced or peeled upwardly to form the second, or locking, flange 40 in the medial portion of the tubular body and abutting end portions of the pilot 26. As would be readily understood by those skilled in the art, this cold-forming displacement of the metal to form the second, or locking, flange 40 produces a harder metal portion.

Figure 10:
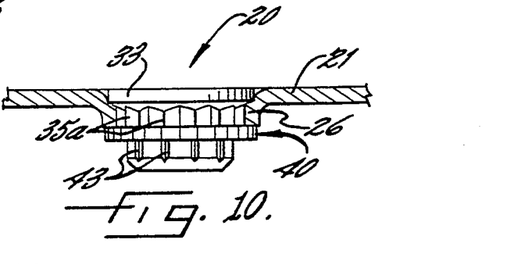
FIG. 10 is a side elevational view, partially in section, illustrating the female clinch fastener installed in the metal sheet according to the invention.
Figure 11:
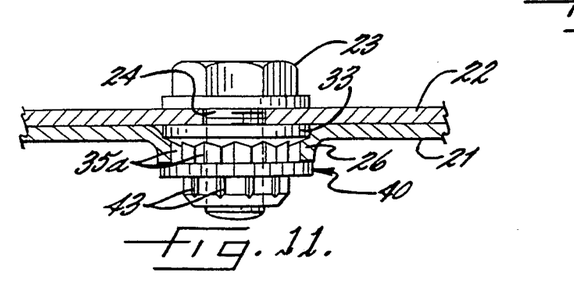
FIG. 11 is a side elevational view, partially in section, illustrating the female clinch fastener being used to secure a second sheet to the first sheet in which the female clinch fastener according to the invention is installed.
Figure 14:
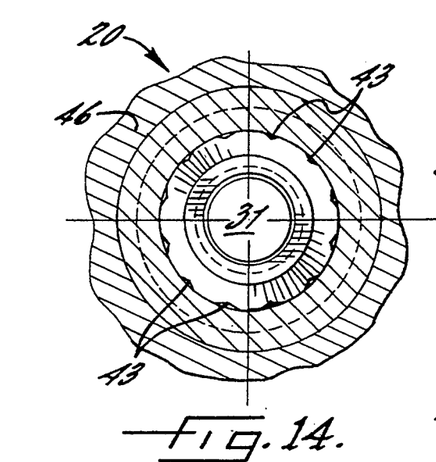
FIG. 14 is a greatly enlarged cross-sectional view taken along lines 14—14 of FIG. 9.
Figure 15:
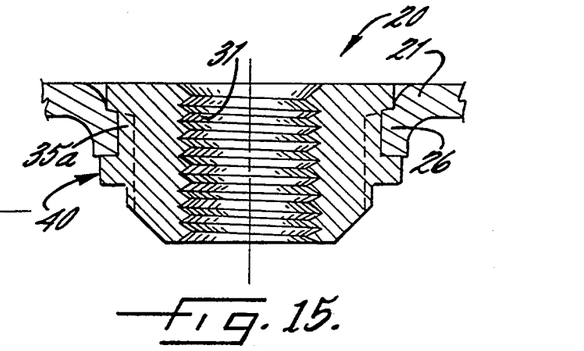
FIG. 15 is a greatly enlarged cross-sectional view through the female clinch fastener of the invention illustrating the distortion of threads to provide a prevailing torque fastener.

The tubular body 30, when driven into the sheet, has a second portion extending longitudinally outward from the second flange 40. The second portion has a transverse cross-sectional diameter less than a predetermined diameter defined by peripheral portions of the splines 35. The second portion of the tubular body 30 also includes a plurality of circumferentially distributed longitudinally extending grooves 43 (FIGS. 10, 11 and 14) in alignment with respective grooves defined between the plurality of splines 35a on the first portion of the tubular body. In other words, the grooves 43 are vestiges of the displaced spline portions.

As a brief summary, the installation method preferably includes the steps of forming an opening 25 in the sheet 21 having a diameter less than a diameter defined by peripheral portions of the splines 35; driving the tubular body 30 of the clinch nut 20 into the opening to form a pilot 26 surrounding the splines along a first portion of the tubular body; and longitudinally displacing portions of the splines 35b along a second portion of the tubular body to form a second laterally extending flange 40 abutting the pilot and cooperating with the first flange 33 to secure the clinch nut to the sheet.

The step of driving the tubular body 30 of the clinch nut 20 preferably includes driving the nut so that the first flange 33 is flush with a surface of the sheet. The clinch nut 20 also preferably includes a tapered second end as shown in the illustrated embodiment so that a further step of aligning the clinch fastener with the opening 25 in the sheet 21 may be performed by positioning the tapered second end partially extending into the opening. In addition, the steps of driving the tubular body 30 and forming the second flange 40 may be performed simultaneously as shown in FIGS. 7-9.

Figure 13:
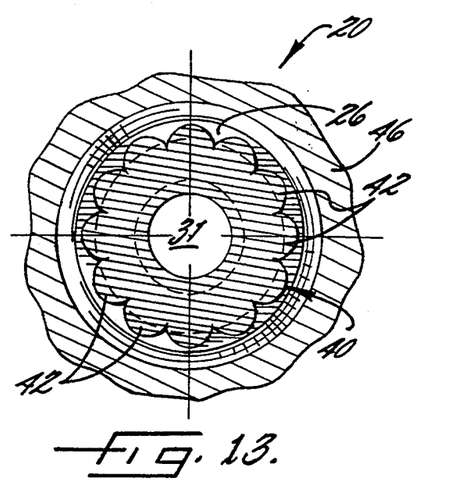
FIG. 13 is a greatly enlarged cross-sectional view taken along lines 13—13 of FIG. 9.

As shown perhaps best in the cross-sectional view of FIG. 13, the second, or locking, flange 40 includes a plurality of radially outwardly extending protrusions 42 longitudinally aligned with respective splines 35a. These protrusions 42 typically have a generally bulbous shape as shown in the illustrated embodiment. The bulbous shape is formed as the metal is displaced upwardly and pinched between end portions of the pilot 26 and the die sleeve 48. The protrusions 42 may have a fairly regular shape and spacing as shown in the illustrated embodiment, while those of skill in the art will readily appreciate that other shapes and configurations may be formed, primarily depending on the shape and spacing of the splines 35.

Figure 12:
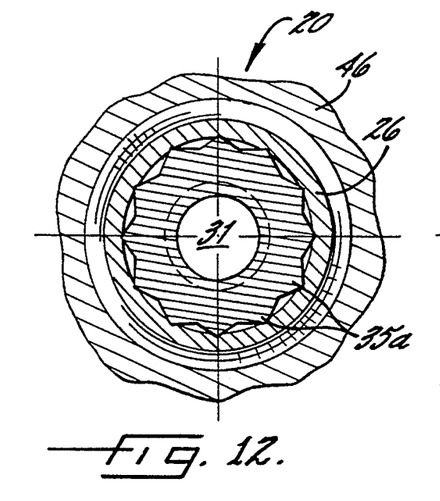
FIG. 12 is a greatly enlarged cross-sectional view taken along lines 12—12 of FIG. 9.

Another aspect of the present invention highlighted by FIG. 12 is that the peripheral edges of the splines 35 have a tendency to dig into adjacent portions of the pilot 26 to prevent relative rotation of the clinch fastener 20 and the pilot 26. Accordingly, the clinch nut 20 of the present invention enjoys high torque-out performance.

Figure 17:
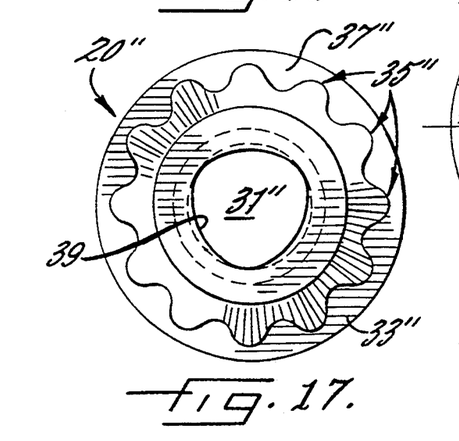
FIG. 17 is a greatly enlarged bottom view, similar to FIG. 16, but illustrating a prevailing torque embodiment of the female clinch fastener according to the invention.

Referring now to the greatly enlarged cross-sectional view of FIG. 17, the prevailing torque fastener feature of the present invention is explained. As would be readily understood by those skilled in the art, a fastener may be made to prevent unintended loosening by distorting portions of the end threads 39. Thus, the mating fastener may only be removed using a tool and vibration and shock will not loosen the fastener. As shown in the illustrated embodiment, the end threads 39 have been distorted into a somewhat triangular shape so that the clinch nut 20" will function as a prevailing torque fastener. This distortion of the bottom threads 39 is facilitated because the threaded bore extends substantially through the entire extent of the tubular body 30, in sharp contrast to a conventional fastener, such as the FLANGEFORM TM.

Many modifications and other embodiments of the invention will come to the mind of one skilled in the art having the benefit of the teachings presented in the foregoing descriptions and the associated drawings. For example, the tubular body shown in the illustrated embodiments has a generally circular cross-sectional shape, while those skilled in the art will appreciate that other geometries, such as generally rectangular or square, may also be used. Therefore, it is to be understood that the invention is not to be limited to the specific embodiments disclosed, and that modifications and embodiments are intended to be included within the scope of the appended claims.

That which is claimed is:

1. A combination of a female clinch fastener secured to a sheet, the sheet having an opening with edge portions of said sheet adjacent the opening being deformed to define a pilot depending from said sheet, said clinch fastener comprising:

a generally tubular body;

first and second laterally extending flanges connected to said tubular body in longitudinally spaced relation and cooperating to secure said tubular body within said pilot of said sheet, said first flange connected to a first end of said tubular body, said second flange connected to a medial portion of said tubular body and abutting outer end portions of said pilot, said second flange comprising a plurality of radially outwardly extending protrusions longitudinally aligned with respective splines; and a plurality of circumferentially distributed splines connected to a first portion of said tubular body and extending longitudinally between said first and second flanges, said splines in engagement with said pilot to prevent rotation of said clinch fastener within said pilot, said splines having peripheral portions defining an imaginary circle having a predetermined diameter;

said tubular body having a second portion extending longitudinally outward from said second flange, said second portion having a transverse cross-sectional diameter less than said predetermined splines.

2. A combination according to claim 1 wherein said tubular body, said first flange and said splines are integrally formed of metal; and wherein said second flange comprises cold-formed metal displaced from said second portion of said tubular body.

3. A combination according to claim 1 wherein a second end portion of said tubular body is tapered.

4. A combination according to claim 1 wherein said first flange is positioned flush with a surface of said sheet opposite the pilot.

5. A combination according to claim 4 wherein said first flange has an inwardly tapered annular surface transverse to said tubular body for facilitating flush mounting of said first flange with said sheet.

6. A combination according to claim 1 wherein said tubular body has a threaded bore extending throughout an entire extent of said tubular body and adapted to receive therein a mating threaded fastener.

7. A combination according to claim 6 wherein threaded portions adjacent the second end of said tubular body are distorted to provide a locking action to a mating threaded fastener received within said tubular body.

8. A combination according to claim 1 wherein said plurality of spines is a predetermined number in a range of about 8 to 16.

9. A combination according to claim 1 wherein said opening in said sheet is generally circular.

10. A combination according to claim 1 wherein said sheet comprises metal.

11. A combination of a female clinch fastener secured to a sheet, the sheet having an opening with edge portions of said sheet adjacent the opening with edge portions of said sheet adjacent the opening being deformed to define a pilot depending from said sheet, said clinch fastener comprising:

a generally tubular body;

first and second laterally extending flanges connected to said tubular body in longitudinally spaced relation and cooperating to secure said tubular body within said pilot of said sheet, said first flange connected to a first end of said tubular body, said second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines having peripheral portions defining an imaginary circle having a predetermined diameter;

said tubular body having a second portion extending longitudinally outward from said second flange, said second portion having a transverse cross-sectional diameter less than said predetermined diameter defined by peripheral portions of said splines, said second portion of said tubular body including a plurality of circumferentially distributed longitudinally extending grooves in alignment with respective grooves defined by said plurality of splines on said first portion of said tubular body.

12. A combination of a female clinch fastener secured to a sheet, the sheet having an opening with edge portions of said sheet adjacent the opening with edge portions of said sheet adjacent the opening being deformed to define a pilot depending from said sheet, said clinch fastener comprising:

a generally tubular body;

first and second laterally extending flanges connected to said tubular body in longitudinally spaced relation and cooperating to secure said tubular body within said pilot of said sheet, said first flange connected to a first end of said tubular body, said second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines having peripheral portions defining an imaginary circle having a predetermined diameter, said plurality of splines defining a polygonal transverse cross-sectional shape;

said tubular body having a second portion extending longitudinally outward from said second flange, said second portion having a transverse cross-sectional diameter less than said predetermined diameter defined by peripheral portions of said splines.

13. A combination of a female clinch fastener secured to a sheet, the sheet having an opening with edge portions of said sheet adjacent the opening with edge portions of said sheet adjacent the opening being deformed to define a pilot depending from said sheet, said clinch fastener comprising:

a generally tubular body;

first and second laterally extending flanges connected to said tubular body in longitudinally spaced relation and cooperating to secure said tubular body within said pilot of said sheet, said first flange connected to a first end of said tubular body, said second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines having peripheral portions defining an imaginary circle having a predetermined diameter, said plurality of splines defining a star-like transverse cross-sectional shape;

said tubular body having a second portion extending longitudinally outward from said second flange, said second portion having a transverse cross-sectional diameter less than said predetermined diameter defined by peripheral portions of said splines.

14. A combination of a female clinch fastener secured to a sheet, the sheet having an opening with edge portions of said sheet adjacent the opening with edge portions of said sheet adjacent the opening being deformed to define a pilot depending from said sheet, said clinch fastener comprising:

a generally tubular body;

first and second laterally extending flanges connected to said tubular body in longitudinally spaced relation and cooperating to secure said tubular body within said pilot of said sheet, said first flange connected to a first end of said tubular body, said second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines having peripheral portions defining an imaginary circle having a predetermined diameter, said plurality of splines defining a serpentine generally circular transverse cross-sectional shape;

said tubular body having a second portion extending longitudinally outward from said second flange, said second portion having a transverse cross-sectional diameter less than said predetermined diameter defined by peripheral portions of said splines.

15. A combination of a female clinch fastener secured to a sheet, the sheet having opposing first and second surfaces and an opening therethrough with portions of said sheet adjacent the opening being deformed to define a pilot depending from the second surface of said sheet, said clinch fastener comprising:

a generally tubular body having a threaded bore and adapted for receiving a mating threaded fastener;

first and second laterally extending flanges connected to said tubular body in longitudinally spaced relation and cooperating to secure said tubular body within said pilot of said sheet, the first flange connected to a first end of said tubular body and positioned flush with the first surface of said sheet, the second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines define a star-like transverse cross-sectional shape, said splines having peripheral portions defining an imaginary circle having a predetermined diameter;

said tubular body having a second portion extending longitudinally outward from said second flange, said second portion having a transverse cross-sectional diameter less than said predetermined diameter defined by peripheral portions of said splines.

16. A combination according to claim 15 wherein said tubular body, said first flange and said splines are integrally formed of metal; and wherein said second flange comprises cold-formed metal displaced from said second portion of said tubular body.

17. A combination according to claim 15 wherein said second portion of said tubular body includes a plurality of circumferentially distributed longitudinally extending grooves in alignment with respective grooves defined by said plurality of splines on said first portion of said tubular body.

18. A combination according to claim 15 wherein said second flange comprises a plurality of radially outwardly extending protrusions longitudinally aligned with respective splines.

19. A combination according to claim 15 wherein a second end portion of said tubular body is tapered.

20. A combination according to claim 15 wherein said first flange has an inwardly tapered annular surface transverse to said tubular body for facilitating flush mounting of said first flange with said sheet.

21. A combination according to claim 15 wherein said tubular body has a threaded bore extending throughout an entire extent of said tubular body, and wherein threaded portions adjacent the second end of said tubular body are distorted to provide a locking action to a mating threaded fastener received within said tubular body.

22. A combination according to claim 15 wherein said plurality of splines is a predetermined number in a range of about 8 to 16.

23. A combination according to claim 15 wherein said sheet comprises metal, and wherein the opening in said metal sheet is generally circular.

24. A combination of a female clinch fastener secured to a sheet, the sheet having opposing first and second surfaces and an opening therethrough with edge portions of said sheet adjacent the opening being deformed to define a pilot depending from the second surface of said sheet, said clinch fastener comprising:

a generally tubular body having a threaded bore adapted for receiving a mating threaded fastener;

first and second laterally extending flanges connected to said tubular body in longitudinally spaced relation and cooperating to secure said tubular body within said pilot of said sheet, the first flange connected to a first end of said tubular body and positioned flush with the first surface of said sheet, the second flange connected to a medial portion of said tubular body and abutting outer end portions of said pilot; and a plurality of circumferentially distributed splines connected to a first portion of said tubular body and extending longitudinally between said first and second flanges, said splines in engagement with said pilot to prevent rotation of said clinch fastener within said pilot, said splines defining a serpentine generally circular transverse cross-sectional shape, said splines having peripheral portions defining an imaginary circle having a predetermined diameter;

said tubular body having a second portion extending longitudinally outward from said second flange, said second portion having a cross-sectional diameter less than said predetermined diameter defined by peripheral portions of said splines.

25. A combination according to claim 24 wherein said tubular body, said first flange and said splines are integrally formed of metal; and wherein said second flange comprises cold-formed metal displaced from said second portion of said tubular body.

26. A combination according to claim 24 wherein said second portion of said tubular body includes a plurality of circumferentially distributed longitudinally extending grooves in alignment with respective grooves defined by said plurality of splines on said first portion of said tubular body.

27. A combination according to claim 24 wherein said second flange comprises a plurality of radially outwardly extending protrusions longitudinally aligned with respective splines.

28. A combination according to claim 24 wherein a second end portion of said tubular body is tapered.

29. A combination according to claim 28 wherein said first flange has an inwardly tapered annular surface transverse to said tubular body for facilitating flush mounting of said first flange with said sheet.

30. A combination according to claim 24 wherein said tubular body has a threaded bore extending throughout an entire extent of said tubular body, and wherein threaded portions adjacent the second end of said tubular body are distorted to provide a locking action to a mating threaded fastener received within said tubular body.

31. A combination according to claim 24 wherein said plurality of splines is a predetermined number in a range of about 8 to 16.

32. A combination according to claim 24 wherein said sheet comprises metal, and wherein the opening in said metal sheet is generally circular.

33. A female clinch fastener adapted to be secured to a sheet by cold-forming, said clinch fastener comprising:

a generally tubular body having a threaded bore and adapted to receive therein a mating threaded fastener;

a first laterally extending flange connected to a first end of said tubular body; and a plurality of circumferentially distributed splines connected to said tubular body and extending longitudinally therealong, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said tubular body for securing said clinch fastener within the pilot of the sheet, said splines defining a star-like transverse cross-sectional shape;

said tubular body having a second end portion being tapered and having a smaller diameter transverse cross-section being axially outermost and a larger diameter transverse cross-section defined by peripheral portions of said splines.

34. A clinch fastener according to claim 33 wherein said bore is threaded throughout an entire extent of said tubular body.

35. A clinch fastener according to claim 34 wherein threaded portions adjacent the second end of said tubular body are distorted to provide a locking action to a mating threaded fastener received within said tubular body.

36. A clinch fastener according to claim 33 wherein said tubular body, said first flange and said splines are integrally formed of metal.

37. A clinch fastener according to claim 36 wherein said metal is selected from the group consisting of low carbon steel, medium carbon steel, and heat treated medium carbon steel.

38. A clinch fastener according to claim 33 wherein said first flange has an inwardly tapered annular surface transverse to said tubular body for facilitating flush mounting of said first flange with the sheet.

39. A female clinch fastener adapted to be secured to a sheet by cold-forming, said clinch fastener comprising:

a generally tubular body having a threaded bore and adapted to receive therein a mating threaded fastener;

a first laterally extending flange connected to a first end of said tubular body; and a plurality of circumferentially distributed splines connected to said tubular body and extending longitudinally therealong, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said tubular body for securing said clinch fastener within the pilot of the sheet, said plurality of splines defining a polygonal transverse cross-sectional shape;

said tubular body having a second end portion being tapered and having a smaller diameter transverse cross-section being axially outermost and a larger diameter transverse cross-section defined by peripheral portions of said splines.

40. A female clinch fastener adapted to be secured to a sheet by cold-forming, said clinch fastener comprising:

a generally tubular body having a threaded bore and adapted to receive therein a mating threaded fastener;

a first laterally extending flange connected to a first end of said tubular body; and a plurality of circumferentially distributed splines connected to said tubular body and extending longitudinally therealong, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said tubular body for securing said clinch fastener within the pilot of the sheet, said plurality of splines defining a serpentine generally circular transverse cross-sectional shape;

said tubular body having a second end portion being tapered and having a smaller diameter transverse cross-section being axially outermost and a larger diameter transverse cross-section defined by peripheral portions of said splines.

41. A clinch fastener according to claim 33 wherein said plurality of splines is a predetermined number in a range of about 8 to 16.

42. A female clinch fastener adapted to be secured to a sheet by cold-forming, said clinch fastener comprising:

a generally tubular metal body having a threaded bore extending throughout an entire extent of said tubular body and adapted to receive therein a mating threaded fastener;

a first laterally extending metal flange integrally formed with said tubular metal body at a first end thereof;

a plurality of circumferentially distributed metal splines integrally formed with said tubular metal body and extending longitudinally therealong, said splines defining a star-like transverse cross-sectional shape, said splines having peripheral portions defining an imaginary circle having a predetermined diameter, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said tubular body for securing said clinch fastener within the pilot of the sheet;

said tubular body having a second end portion being tapered and having a smaller diameter portion being axially outermost and a larger diameter portion defined by peripheral portions of said splines.

43. A clinch fastener according to claim 42 wherein said bore is threaded throughout an entire extent of said tubular body.

44. A clinch fastener according to claim 43 wherein threaded portions adjacent the second end of said tubular body are distorted to provide a locking action to a mating threaded fastener received within said tubular body.

45. A clinch fastener according to claim 42 wherein said metal is selected from the group consisting of low carbon steel, medium carbon steel, and heat treated medium carbon steel.

46. A clinch fastener according to claim 42 wherein said first flange has an inwardly tapered annular surface transverse to said tubular body for facilitating flush mounting of said first flange with the sheet.

47. A clinch fastener according to claim 42 wherein said plurality of splines is a predetermined number in a range of about 8 to 16.

48. A female clinch fastener adapted to be secured to a sheet by cold-working, said clinch fastener comprising:

a generally tubular metal body having a threaded bore extending throughout an entire extent of said tubular body and adapted to receive therein a mating threaded fastener;

a first laterally extending metal flange integrally formed with said tubular metal body at a first end thereof;

a plurality of circumferentially distributed metal splines integrally formed with said tubular metal body and extending longitudinally therealong, said splines defining a serpentine generally circular transverse cross-sectional shape, said splines having peripheral portions defining an imaginary circle having a predetermined diameter, a first longitudinally extending portion of said splines being adapted to be secured within a pilot formed in the sheet to prevent rotation of said clinch fastener, a second longitudinally extending portion of said splines being adapted to be displaced longitudinally to form a second laterally extending flange in a medial portion of said tubular body for securing said clinch fastener within the pilot of the sheet;

said tubular body having a second end portion being tapered and having a smaller diameter portion being axially outermost and a larger diameter portion defined by peripheral portions of said splines.

49. A clinch fastener according to claim 48 wherein said bore is threaded throughout an entire extent of said tubular body.

50. A clinch fastener according to claim 49 wherein threaded portions adjacent the second end of said tubular body are distorted to provide a locking action to a mating threaded fastener received within said tubular body.

51. A clinch fastener according to claim 48 wherein said metal is selected from the group consisting of low carbon steel, medium carbon steel, and heat treated medium carbon steel.

52. A clinch fastener according to claim 48 wherein said first flange has an inwardly tapered annular surface transverse to said tubular body for facilitating flush mounting of said first flange with the sheet.

53. A clinch fastener according to claim 48 wherein said plurality of splines is a predetermined number in a range of about 8 to 16.

54. A method for securing a female clinch fastener to a sheet, the clinch fastener including a tubular body with a first laterally extending flange at an end thereof and a plurality of longitudinally extending splines circumferentially distributed on the tubular body, the method comprising the steps of:

forming an opening in the sheet having a diameter less than a diameter defined by peripheral portions of the splines;

driving the tubular body of the clinch fastener into the opening to form a pilot from edge portions of the sheet so that the pilot surrounds the splines along a first longitudinal portion of the tubular body; and longitudinally displacing portions of the splines from along a second longitudinal portion of the tubular body to form a second laterally extending flange abutting the pilot and cooperating with the first flange to secure the clinch fastener to the sheet.

55. A method according to claim 54 wherein the step of driving the tubular body comprises driving same so that the first flange is flush with a surface of the sheet.

56. A method according to claim 54 wherein the clinch fastener includes a tapered second end, and further comprising the step of aligning the clinch fastener with the opening in the sheet by positioning the tapered second end partially extending into the opening.

57. A method according to claim 54 wherein the steps of driving the tubular body and forming the second flange are performed simultaneously.

58. A method according to claim 54 wherein the clinch fastener includes a threaded bore extending throughout an entire length of the tubular body; and further comprising the step of distorting end threads to provide a locking action to a mating threaded fastener secured within the tubular body.

* * * * *